US012754820B2

(12) United States Patent
Maharaja et al.

(10) Patent No.: US 12,754,820 B2
(45) Date of Patent: Oct. 6, 2026

(54) SYSTEMS AND METHODS FOR IMPLEMENTING A MIXED REALITY APPARATUS TO AUTOMATICALLY AND DYNAMICALLY GENERATE OUTPUT BASED ON SOURCE CODE

(71) Applicant: BANK OF AMERICA CORPORATION, Charlotte, NC (US)

(72) Inventors: Raja Arumugam Maharaja, Tamil Nadu (IN); Natrajan Sundaram, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 222 days.

(21) Appl. No.: 18/371,578

(22) Filed: Sep. 22, 2023

(65) Prior Publication Data

US 2025/0103462 A1 Mar. 27, 2025

(51) Int. Cl.
*G06F 11/3668* (2025.01)
*G06F 11/3604* (2025.01)
*G06N 20/00* (2019.01)

(52) U.S. Cl.
CPC ......... *G06F 11/3608* (2013.01); *G06N 20/00* (2019.01)

(58) Field of Classification Search
CPC .................................................. G06F 11/3668
See application file for complete search history.

(56) References Cited

U.S. PATENT DOCUMENTS

| | | | |
|---|---|---|---|
| 8,468,244 | B2 | 6/2013 | Redlich |
| 8,739,116 | B2 | 5/2014 | Ahadian |
| 9,400,644 | B2 | 7/2016 | Mahajan |
| 10,353,796 | B2 | 7/2019 | Frenkiel |
| 10,515,005 | B1 | 12/2019 | Burrell |
| 10,521,284 | B2 | 12/2019 | Mcclory |
| 10,733,087 | B2 | 8/2020 | Wiener |
| 10,754,761 | B2 | 8/2020 | Tannous |
| 10,795,660 | B1 | 10/2020 | Sundresh |
| 10,841,120 | B2 | 11/2020 | Myers, III |
| 11,080,164 | B2 | 8/2021 | Raviv |
| 11,151,271 | B2 | 10/2021 | Thoren |

(Continued)

FOREIGN PATENT DOCUMENTS

| | | | |
|---|---|---|---|
| CN | 106796522 | A | 5/2017 |
| EP | 3189464 | B1 | 7/2017 |

*Primary Examiner* — Jae U Jeon

(74) *Attorney, Agent, or Firm* — Moore & Van Allen PLLC; Lauren M. Stokes

(57) ABSTRACT

Systems, computer program products, and methods are described herein for implementing a mixed reality apparatus to automatically and dynamically generate output based on source code. The present disclosure is configured to identify at least one source code statement; train the source code output machine learning model with the at least one source code statement; generate at least one input data for the at least one source code statement, the at least one input data is associated with an at least one expected output data; apply the at least one input data to the source code output machine learning model; output the at least one sample output data; transmit the at least one sample output data to a mixed reality apparatus; and compare the at least one sample output data and the at least one expected output data and determine whether the at least one source code statement is valid.

20 Claims, 9 Drawing Sheets

(56) References Cited

U.S. PATENT DOCUMENTS

| | | | |
|---|---|---|---|
| 11,182,503 | B2 | 11/2021 | Panchapakesan |
| 11,194,565 | B2 | 12/2021 | Ryall |
| 11,552,996 | B2 | 1/2023 | Lang |
| 2006/0101435 | A1 | 5/2006 | Akilov |
| 2006/0236310 | A1 | 10/2006 | Domeika |
| 2010/0293524 | A1 | 11/2010 | Ahadian |
| 2013/0278635 | A1 * | 10/2013 | Maggiore ............. G06F 3/0304 345/633 |
| 2017/0212829 | A1 * | 7/2017 | Bales .................. G06F 11/3604 |
| 2019/0251244 | A1 * | 8/2019 | Li ............................. H04L 9/40 |
| 2020/0097845 | A1 * | 3/2020 | Shaikh ............... G06Q 30/0201 |
| 2022/0357731 | A1 * | 11/2022 | Lekarczyk ......... G05B 23/0216 |
| 2023/0351491 | A1 * | 11/2023 | Kramer ................ G06N 3/0464 |
| 2024/0087252 | A1 * | 3/2024 | Saha ....................... G06F 21/31 |
| 2024/0104854 | A1 * | 3/2024 | Kwatra .................... G06N 5/01 |

* cited by examiner

SYSTEMS AND METHODS FOR IMPLEMENTING A MIXED REALITY APPARATUS TO AUTOMATICALLY AND DYNAMICALLY GENERATE OUTPUT BASED ON SOURCE CODE

TECHNOLOGICAL FIELD

Example embodiments of the present disclosure relate to implement a mixed reality apparatus to automatically and dynamically generate output based on source code.

BACKGROUND

There exists a need to protect source code lines and the logic that the source code lines are based on from viewers and users, while also allowing users that have security clearance to view and fix potential bugs within the source code lines. Similarly, there exists a need to continuously generate output data based on the source code lines, without showing the underlying logic or source code publicly, even to those viewers that have clearance to view the input and output in real time. Thus, there exists a need for a system to protect source code and the underlying logic efficiently and securely, while also providing a mechanism for generating output data in secure, efficient, dynamic, and accurate manner.

Applicant has identified a number of deficiencies and problems associated with protecting source code and the underlying logic while also allowing the processing of input data to generate output data automatically. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for implementing a mixed reality apparatus to automatically and dynamically generate output based on source code.

In one aspect, a system for implementing a mixed reality apparatus to automatically and dynamically generate output based on source code is provided. In some embodiments, the system may comprise: a memory device with computer-readable program code stored thereon; at least one processing device, wherein executing the computer-readable code is configured to cause the at least one processing device to perform the following operations: identify at least one source code statement; apply the at least one source code statement to a source code output machine learning model and train the source code output machine learning model with the at least one source code statement; generate at least one input data for the at least one source code statement, wherein the at least one input data is associated with an at least one expected output data; apply the at least one input data to the source code output machine learning model; output, by the source code output machine learning model, the at least one sample output data associated with the at least one input data applied to the source code output machine learning model; transmit the at least one sample output data to a mixed reality apparatus; and compare the at least one sample output data and the at least one expected output data and determine whether the at least one source code statement is valid, wherein, in an instance where the at least one sample output data does not match the at least one expected output data, determine the at least one source code statement is invalid, or wherein, in an instance where the at least one sample output data does match the at least one expected output data, determine the at least one source code statement is valid.

In some embodiments, the application of the at least one source code statement to the source code output machine learning model occurs before the application of the at least one input data to the source code output machine learning model.

In some embodiments, the computer-readable code may be further configured to cause the at least one processing device to perform the following operations: generate a sample output data interface component, the sample output data interface component comprising the at least one sample output data; and transmit the sample output data interface component to the mixed reality apparatus to configure a field of view of the mixed reality apparatus. In some embodiments, the sample output data interface component configures the field of view of the mixed reality apparatus with the at least one source code statement that is determined as invalid. In some embodiments, the computer-readable code may be further configured to cause the at least one processing device to perform the following operations: receive, by the mixed reality apparatus, a user input comprising a change indication associated with the at least one source code statement; and generate, in response to receiving the user input, an intelligent source code change to the at least one source statement, wherein the intelligent source code change comprises a change to the at least one source code associated with the invalid determination.

In some embodiments, the mixed reality apparatus comprises a mixed reality smart glass.

In some embodiments, the computer-readable code may be further configured to cause the at least one processing device to perform the following operations: identify a user identifier associated with the mixed reality apparatus; identify, based on the user identifier, a security attribute; and configure, based on the security attribute, a source code interface component to configure a field of view of the mixed reality apparatus, wherein the source code interface component comprises a secure rendering of the at least one source code statement based on the security attribute. In some embodiments, the security attribute is based on an entity identifier stored in association with the user identifier.

In some embodiments, the computer-readable code may be further configured to cause the at least one processing device to perform the following operations: collect a set of previous source code statements from a source code statement database; apply a set of previous data inputs to the set of previous source code statements; generate a set of previous expected output data based on the application of the previous data inputs; create a first training data set comprising the set of previous expected output data, the set of previous source code statements, and the set of previous data inputs; and train the source code output machine learning model with the first training data set.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure.

Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
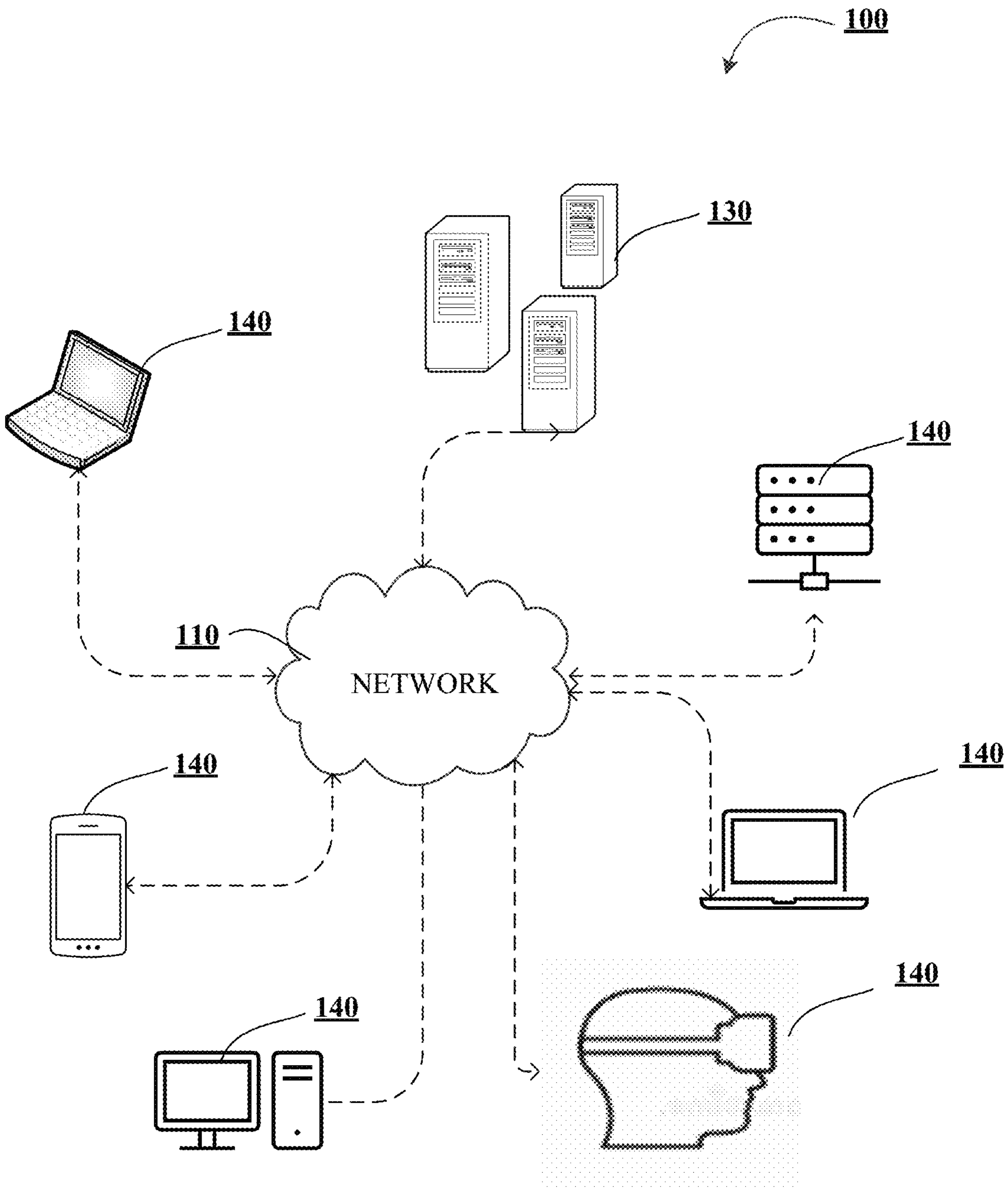
Figure 1B:
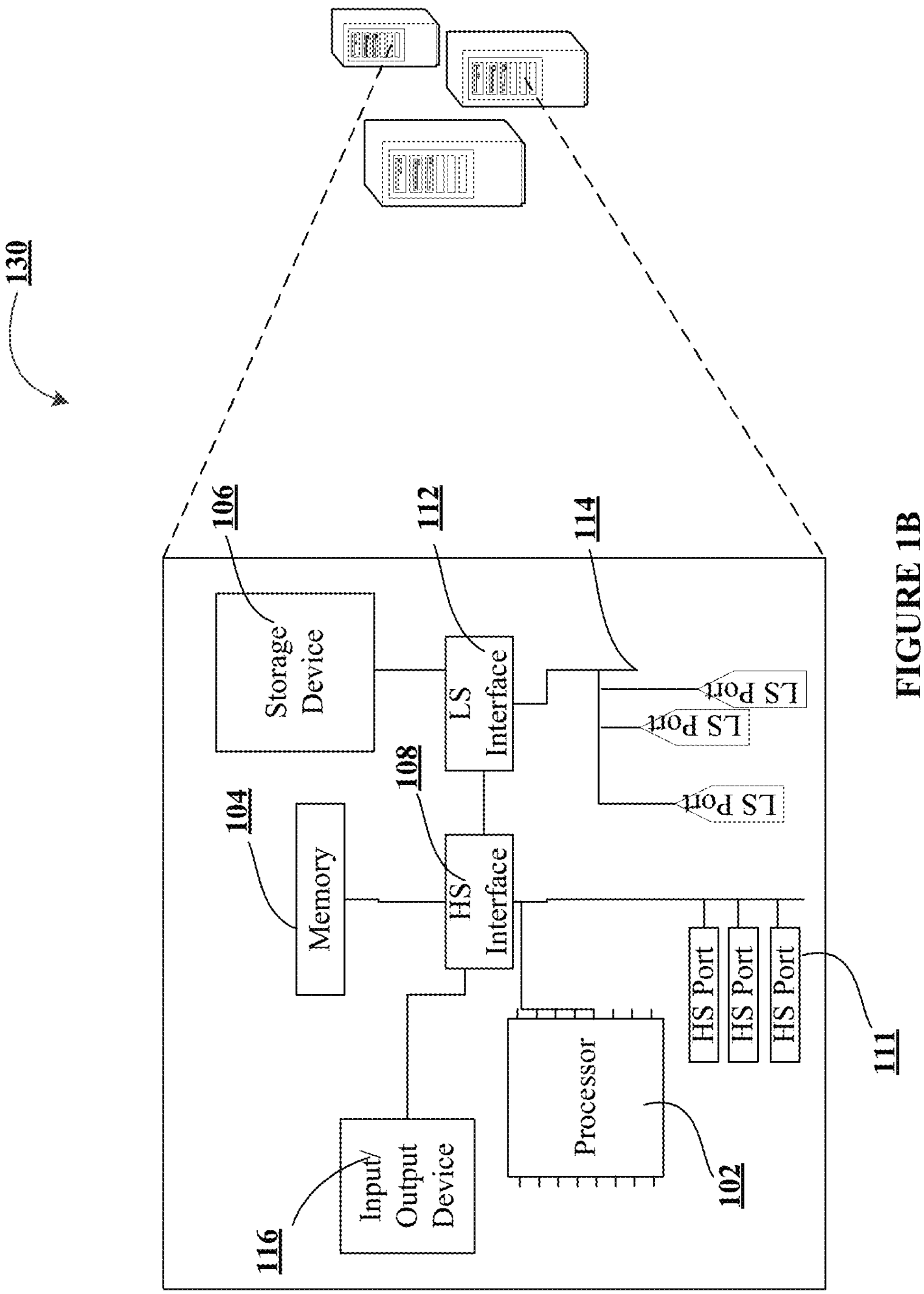
Figure 1C:
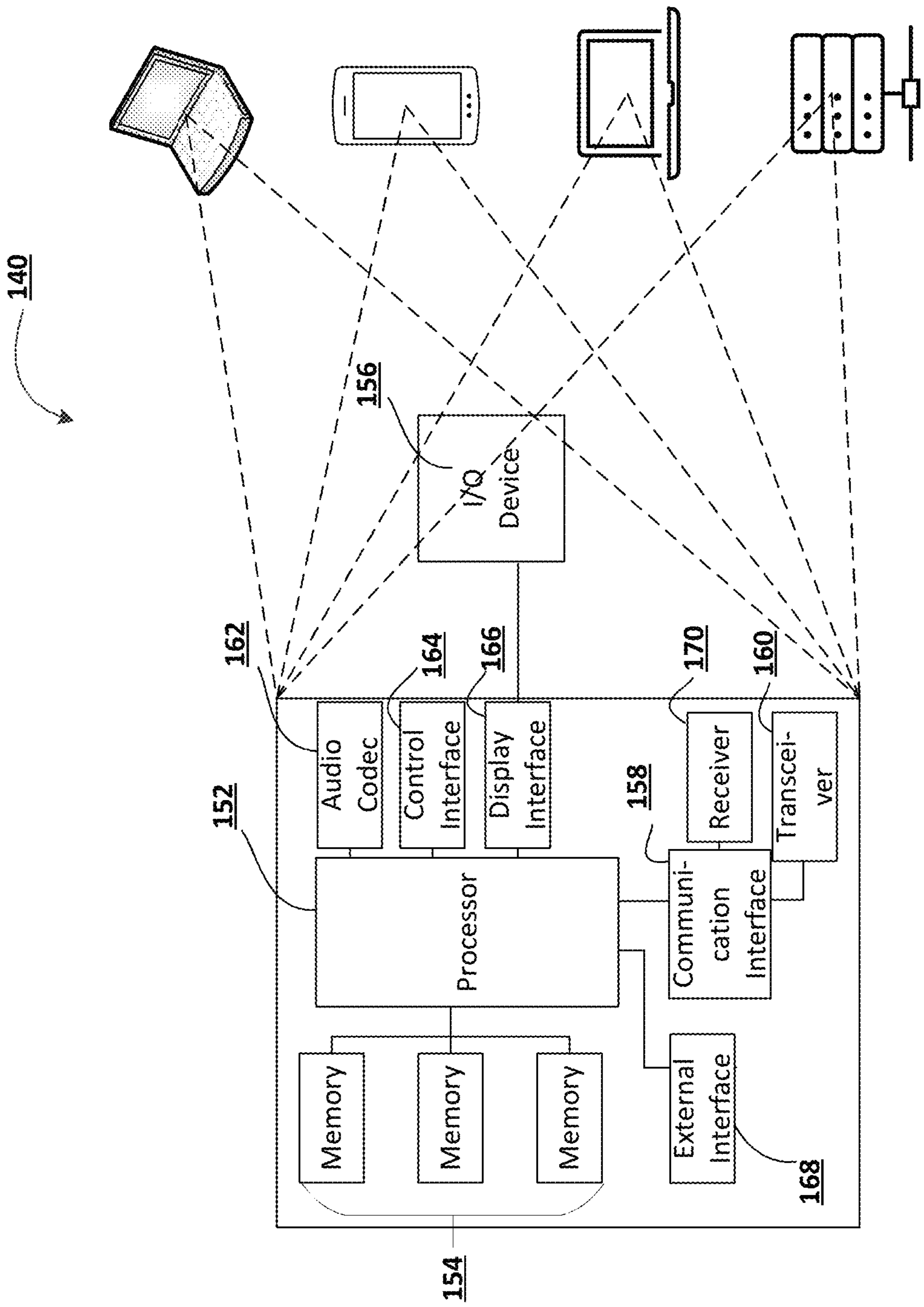
Figure 2:
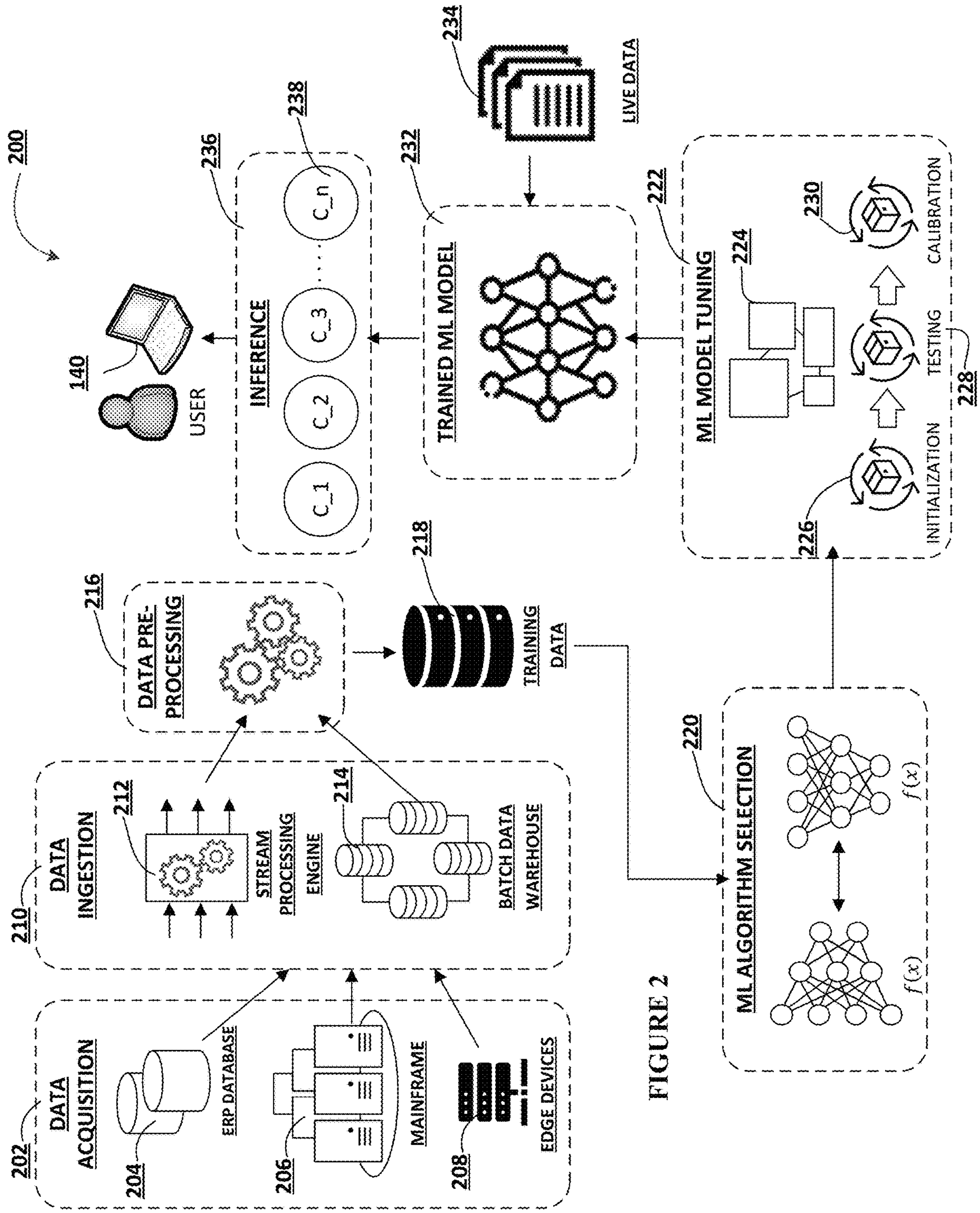
Figure 3:
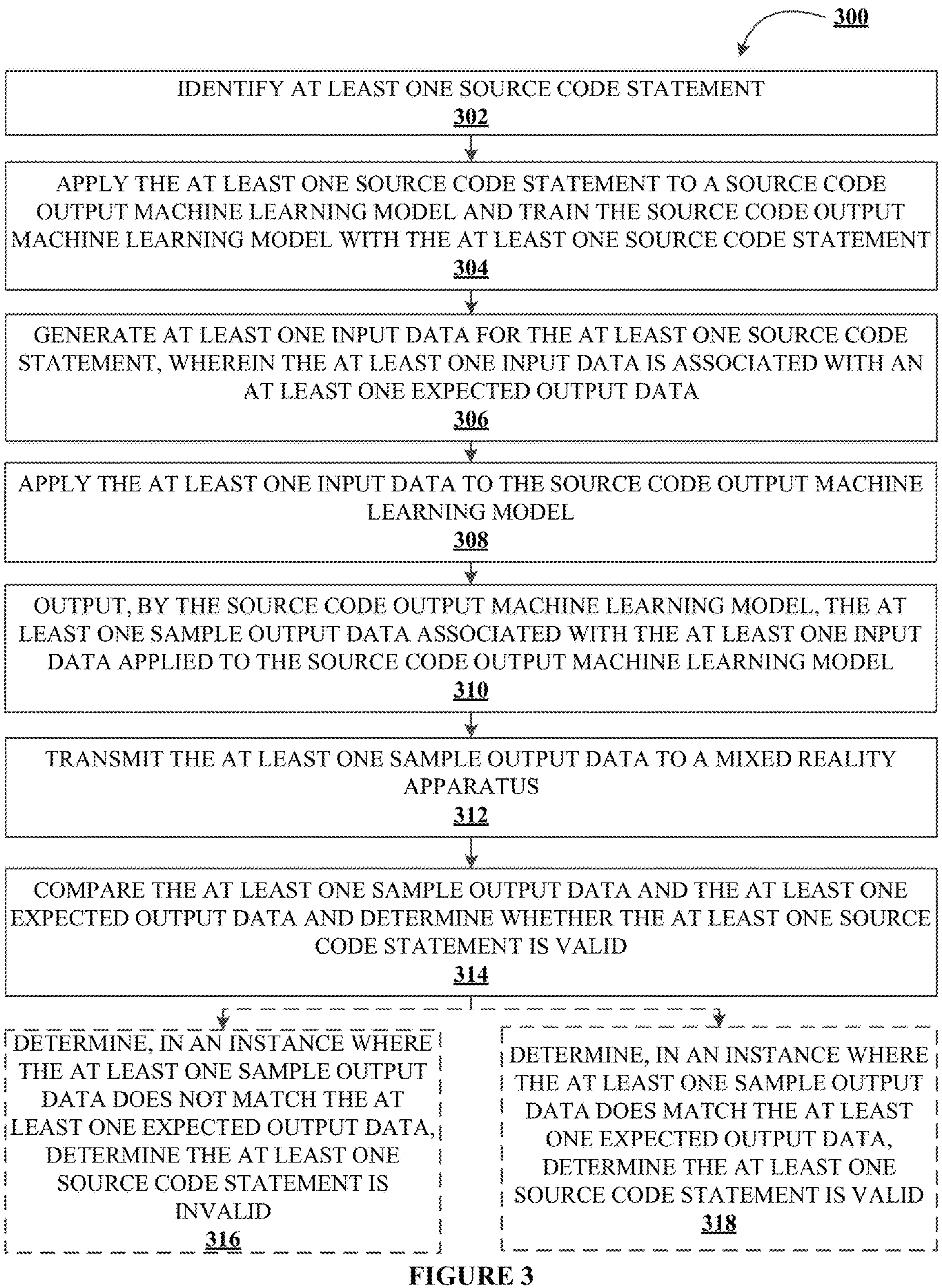
Figure 4:
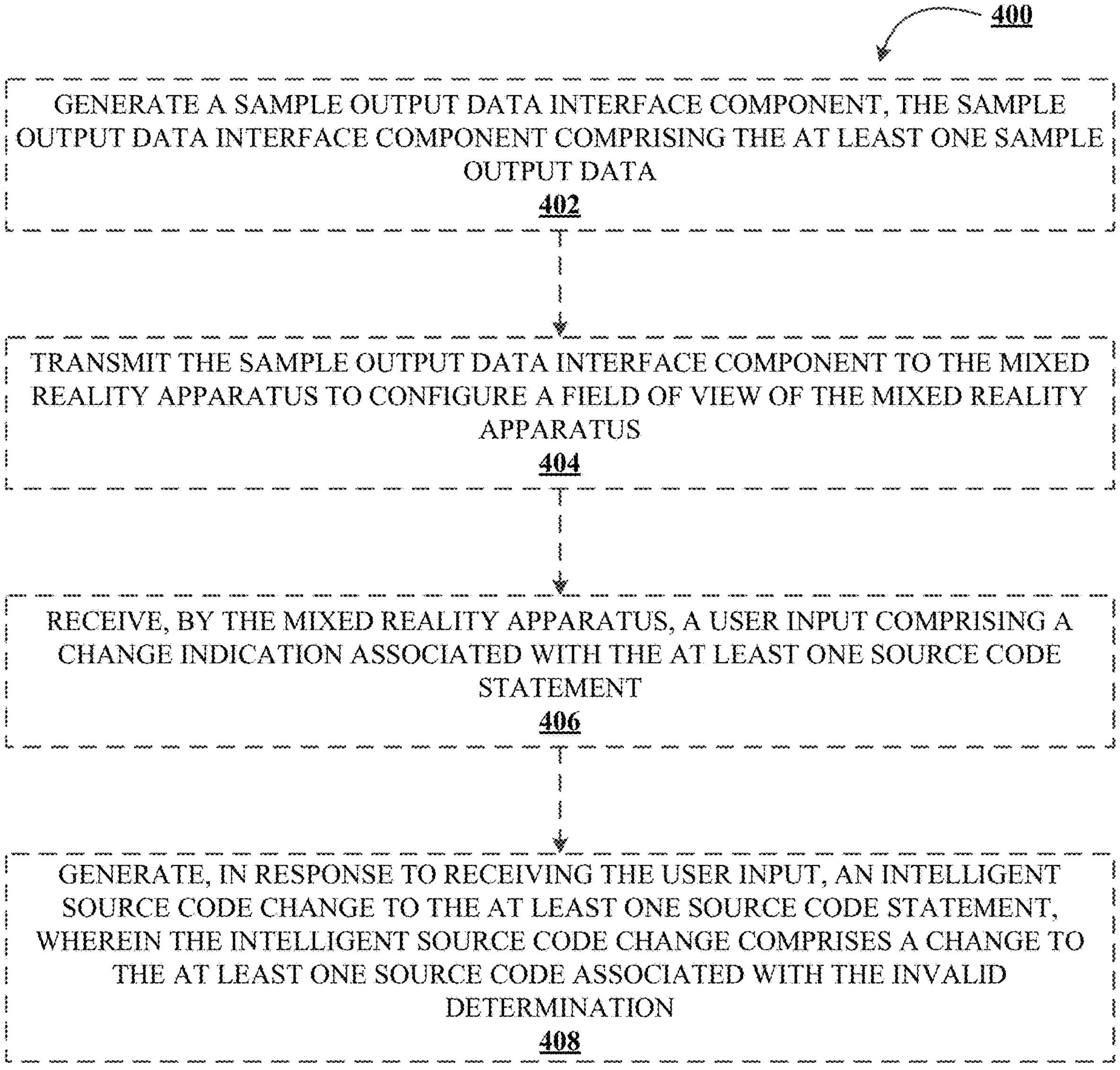
Figure 5:
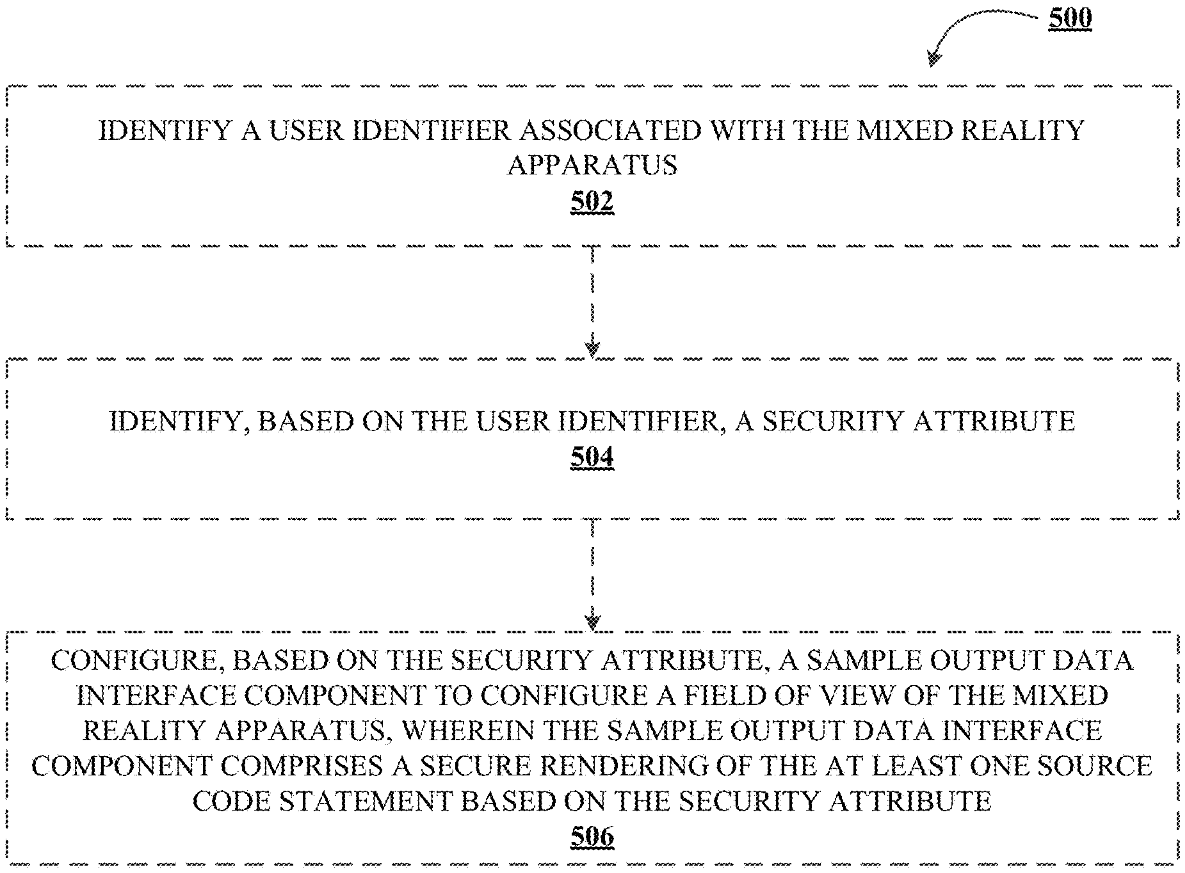
Figure 6:
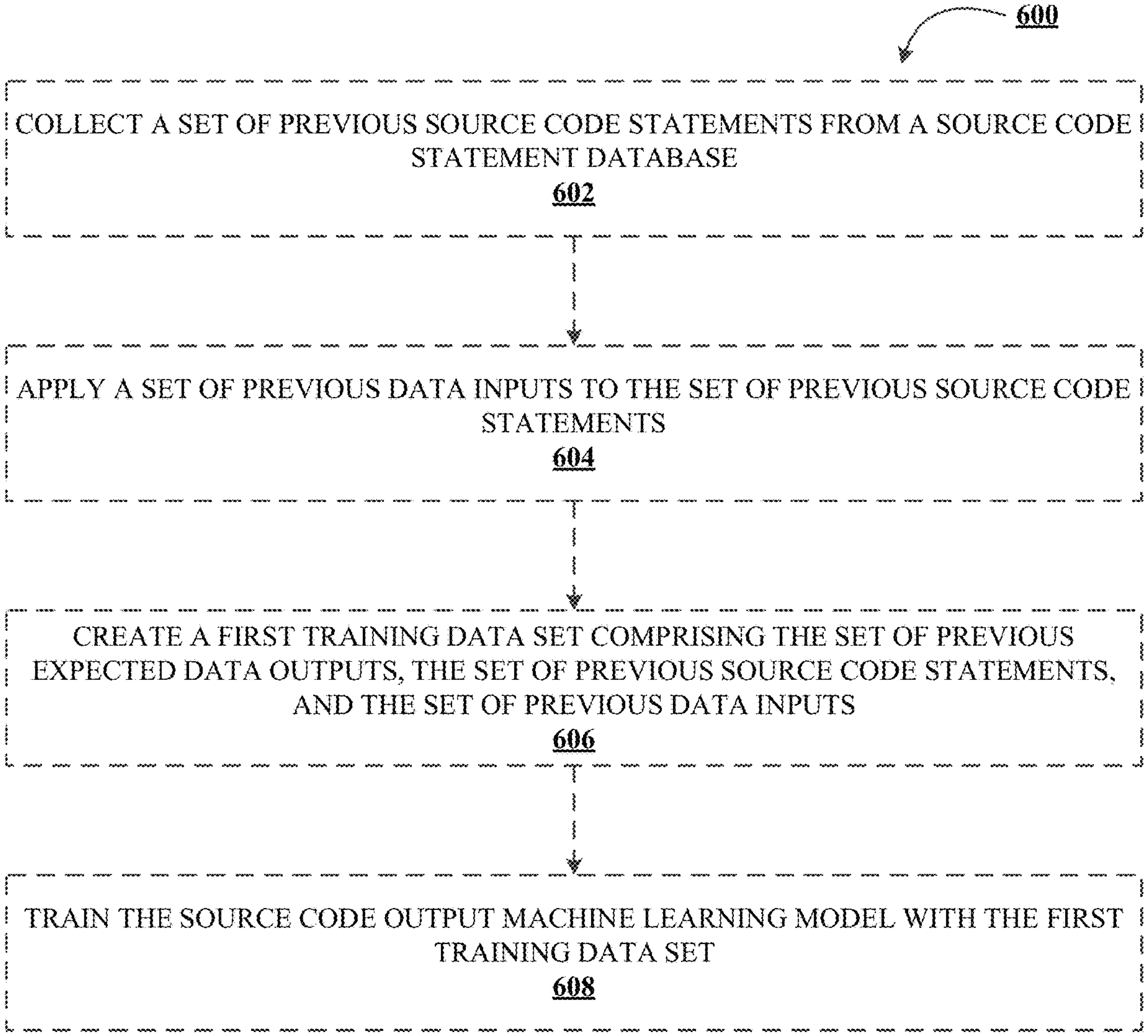
Figure 7A:
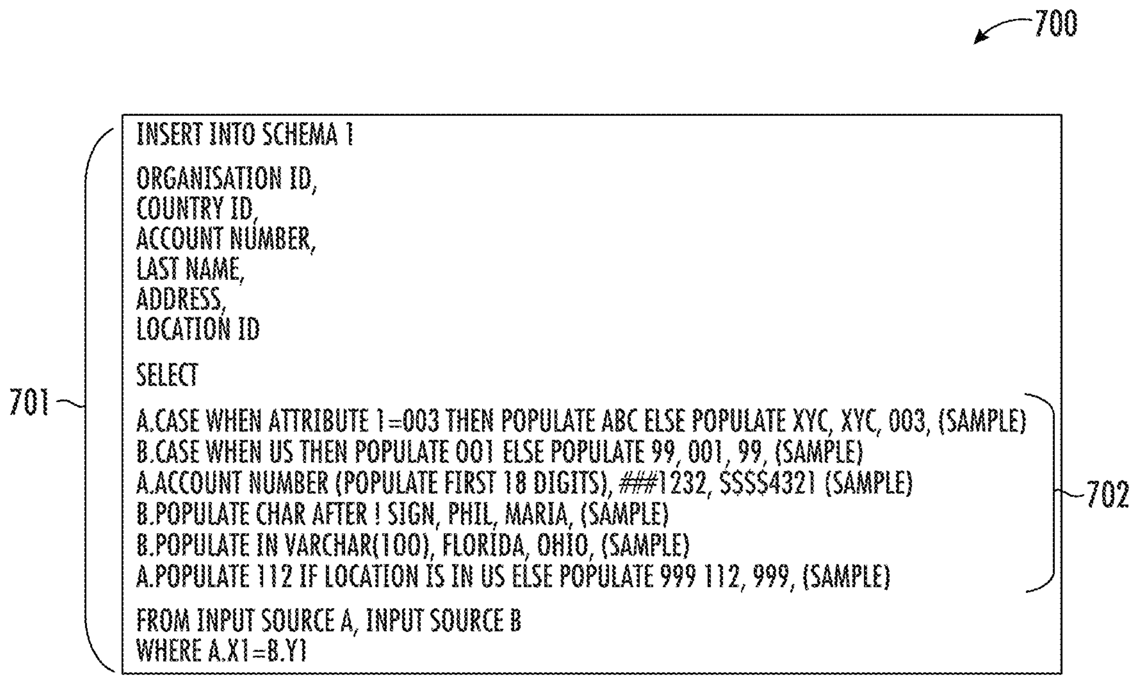
Figure 7B:
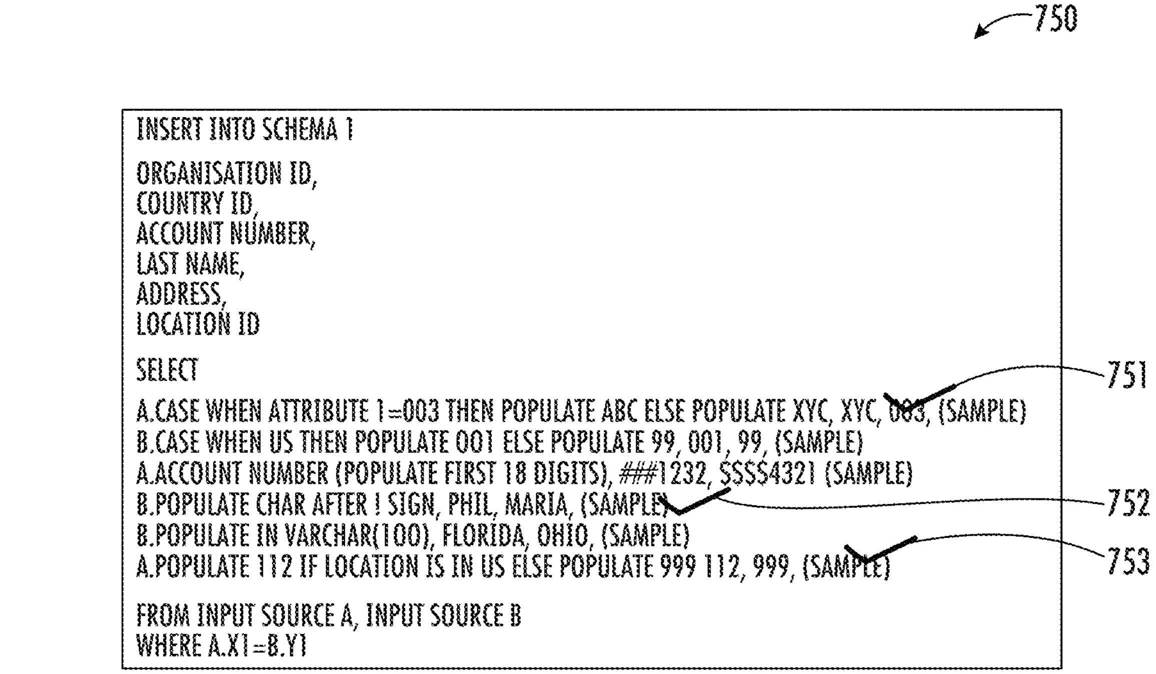

FIGS. 1A-1C illustrates technical components of an exemplary distributed computing environment for implementing a mixed reality apparatus to automatically and dynamically generate output based on source code, in accordance with an embodiment of the disclosure;

FIG. 2 illustrates technical components of an exemplary machine learning subsystem, in accordance with an embodiment of the disclosure;

FIG. 3 illustrates a process flow for implementing a mixed reality apparatus to automatically and dynamically generate output based on source code, in accordance with an embodiment of the disclosure;

FIG. 4 illustrates a process flow for generating an intelligent source code change to the at least one source code statement, in accordance with an embodiment of the disclosure;

FIG. 5 illustrates a process flow for configuring a sample output data interface component comprising a secure rendering of the at least one source code statement, in accordance with an embodiment of the disclosure;

FIG. 6 illustrates a process flow for training the source code output machine learning model in at least a first instance, in accordance with an embodiment of the disclosure; and FIGS. 7A-7B illustrate exemplary graphical user interfaces and field of views showing source code statements, exemplary input data, and exemplary sample output data, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

There exists a need to protect source code lines and the logic that the source code lines are based on from viewers and users, while also allowing users that have security clearance to view and fix potential bugs within the source code lines. Similarly, there exists a need to continuously generate output data based on the source code lines, without showing the underlying logic or source code publicly, even to those viewers that have clearance to view the input and output in real time. Thus, there exists a need for a system to protect source code and the underlying logic efficiently and securely, while also providing a mechanism for generating output data in secure, efficient, dynamic, and accurate manner.

Thus, the present disclosure provides a system, method, or apparatus for training a source code output machine learning model to process input data and generate output data (e.g., sample output data) which may be compared against an optimal output data (e.g., an expected output data) which would be generated if the source code statement(s) and source code output machine learning model were optimally code and trained for the underlying logic. Further, and in order for a user (such as an information technology user, security user, and/or the like) that has the clearance to view the source code statement(s) to view the source code statement(s) in a secure manner, the system may be configured to transmit an interface component comprising the data of the source code statement(s) to a mixed reality apparatus (such as a pair of smart glasses). Additionally, and while the user of the mixed reality apparatus is viewing the source code statement(s) and input data/output data, the mixed reality apparatus and/or another user device may receive user inputs for updates to the source code statement(s) themselves or the previously generated output data. Such updates to the source code statement(s) and/or output data may then be used, in some embodiments, to train and refine the source code output machine learning model to optimize the source code output machine learning model in an accurate, efficient, and dynamic manner.

Accordingly, the present disclosure provides for identifying at least one source code statement (e.g., a line of programming) and applying the at least one source code statement to a source code output machine learning model and train the source code output machine learning model with the at least one source code statement (e.g., such that the source code output machine learning model may be used in place of the source code statement(s)). Further, the present disclosure provides for generating at least one input data for the at least one source code statement, wherein the at least one input data is associated with an at least one expected output data (e.g., object data generated based on input data to the trained source code output machine learning model which acts in the place of the source code statement(s)). The present disclosure further provides for applying the at least one input data to the source code output machine learning model and outputting, by the source code output machine learning model, the at least one sample output data associated with the at least one input data applied to the source code output machine learning model, which may then be transmitted to a mixed reality apparatus (e.g., a pair of smart glasses). The present disclosure further provides for comparing the at least one sample output data and the at least one expected output data and determine whether the at least one source code statement is valid, wherein, in an instance where the at least one sample output data does not match the at least one expected output data, determine the at least one source code statement is invalid (e.g., the sample output data and/or the underlying source code statements need to be updated and/or changed), or wherein, in an instance where the at least one sample output data does match the at least one expected output data, determine the at least one source code statement is valid.

What is more, the present disclosure provides a technical solution to a technical problem. As described herein, the technical problem includes protecting source code and the underlying logic while also allowing the processing of input data to generate output data automatically. The technical solution presented herein allows for the training of a source code output machine learning model based on at least one source code statement, input data, and expected output data, whereby the source code output machine learning model may be used in place of the source code statement(s). Further, the technical solution allows for the use of a mixed reality apparatus to show a user data (such as the sample output data generated by the source code output machine learning model and the input data) and allow the user to make changes to the data and/or source code statements as necessary, without showing the source code statements unnecessarily In particular, the technical solution described herein is an improvement over existing solutions to protect source code and the underlying logic while also allowing for the generation of output data in an efficient and accurate manner, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing a mixed reality apparatus to automatically and dynamically generate output based on source code 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, mixed reality apparatuses, smart glasses, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer—or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location—related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for implementing a mixed reality apparatus to automatically and dynamically generate output based on source code, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, a machine learning model (e.g., such as the machine learning subsystem described herein with respect to FIG. 2) may perform some or all of the steps described in process flow 300.

As shown in block 302, the process flow 300 may include the step of identifying at least one source code statement. As used herein, the term "source code" refers to human-readable programming language (which may be input to a computer and converted to computer-readable instructions), whereby input data may be received, applied to the source code, and an output data is generated. In some embodiments, the source code is a collection of text, numbers, and other such characters, with or without comments, whereby the computer readable text is written using human-readable programming language. Similarly, and as used herein, the term "source code statement" refers to a source code line or a singular line of programming language whereby an input is received or identified, and an output is generated.

As shown in block 304, the process flow 300 may include the step of applying the at least one source code statement to a source code output machine learning model and training the source code output machine learning model with the at least one source code statement. For example, a source code output machine learning model may comprise a machine learning model that has been currently or previously trained with the at least one source code statement, such that the machine learning model itself may act as the source code statement when analyzing the input (e.g., an exemplary input, sample input, actual input, an input data, and/or the like) and generating an output (e.g., a sample output data, an expected output data, and/or the like).

In some embodiments, in order to train the source code output machine learning model, the system may apply at least one exemplary or sample input data to an at least one source code statement and generate an expected output data, and then apply the same at least one exemplary or sample input data and the associated generated expected output data to the source code output machine learning model. In this manner, the source code output machine learning model may determine its own pattern of logic behind the source code statement(s) in order to determine and generate future output data when it receives or identifies input data. Thus, the source code output machine learning model—after it has been trained iteratively—will be able to replace the at least one source code statements that it has already been trained on.

In some embodiments, such an iterative training may occur over a predetermined set amount of time, such as a pre-determined number of days (e.g., 10 days minimum, 28 days minimum, a month minimum, and/or the like), or based on pre-determined set of iterations (e.g., 100 iterations, 200 iterations, 300 iterations, and/or the like). In some embodiments, the source code output machine learning model may be trained based on a maximum number of days (10 days maximum, 28 days maximum, a month maximum, and/or the like) and/or iterations. In some embodiments, and where the code output machine learning model needs to be retrained (such as where the source code output is wrong or different from what is expected), the retraining may occur over a minimum period of time (e.g., such as a single day, 10 days, 28 days, and/or the like) and/or a minimum number of iterations.

In some embodiments, the application of the at least one source code statement to the source code output machine learning model may occur before the application of the at least one input data to the source code output machine learning model. In this manner, the source code output machine learning model may be trained before receiving and processing any input data.

As shown in block 306, the process flow 300 may include the step of generating at least one input data for the at least one source code statement, wherein the at least one input data is associated with an at least one expected output data. For instance, the system may generate the at least one input data based on receiving and/or identifying a user input; by identifying a previous output data; by identifying a piece of data stored in an index, database, table, and/or the like; and/or the like. For instance, and where a previous line of a source code has generated a sample output, and where the previously generated sample output is used as an input to a later source code line (or the source code output machine learning model acting in its place), the system may use the previously generated sample output as the input data for a later source code statement. In some embodiments, data may be stored in a database, index, table, and/or the like, and the system may pull pieces of organized data—automatically—and input the data into the source code output machine learning model. Additionally, and/or alternatively, and where the at least one input data is received from a user, the user input may have been transmitted from a user device (such as a user device associated with a client of the system, a user device associated with a manager of the system, and/or the like).

As shown in block 308, the process flow 300 may include the step of applying the at least one input data to the source code output machine learning model. For instance, the system may apply the at least one input data for the at least one source code statement, whereby the at least one input data may be applied to the source code output machine learning model, which has been trained by the at least one source code statement to generate the same output as the at least one source code statement if the at least one input was applied. In this manner, the source code output machine learning model may take the place of the at least one source code statement and generate the at least one output.

As shown in block 310, the process flow 300 may include the step of outputting—by the source code output machine learning model—the at least one sample output data associated with the at least one input data applied to the source code output machine learning model. As used herein, the sample output data refers to an output data from the source code output machine learning model after the at least one least one input data is applied and processed by the source code output machine learning model. Such a sample output data may be compared against an expected output data that would've been correctly generated if either the source code output machine learning model was acting correctly and/or if the source code statement used to generate the expected output data is written correctly and processing correctly. In some embodiments, an expected output data may be different than the output actually generated by either the source code output machine learning model and/or the source code statement, especially in the instance where the underlying logic intended for the source code statement is different from the source code statement written (e.g., where the source code statement has a bug). Thus, and in some embodiments, the expected output data refers to the ideal output data based on the underlying logic that was intended for the source code statement(s).

In some embodiments, the sample output data may be the exact same as an expected output which is expected when the at least one input data is applied to and processed by the at least one source code statement and the at least one source code statement is correct.

As shown in block 312, the process flow 300 may include the step of transmitting the at least one sample output data to a mixed reality apparatus. In some embodiments, the mixed reality apparatus may comprise a mixed reality smart glass (or mixed reality smart glasses), such as the mixed reality smart glass shown in FIG. 1A. For instance, the smart glasses may comprise a microphone to receive user-provided speech indicators for whether the data shown in the field of view from the smart glasses are correct (e.g., the sample output data), such that the smart glasses may be voice-controlled. In some embodiments, the smart glasses may comprise one or more sensors configured to track the position, movement, and/or orientation of various structures within the user's eyes. In some embodiments, the at least one sample output data may be transmitted to a pair of smart glasses which comprise human-wearable computers that are configured with an overlay of display(s) using mixed reality (or augmented reality) to show data to the user without blocking the view of the glasses to actual real-world objects. For instance, and where a user is using the smart glasses to view a computer's graphical user interface with Data A, then Data B may be overlayed using the smart glasses field of view to show both Data A and Data B in a particular formation.

In some embodiments, the at least one sample output data may additionally, and/or alternatively, be transmitted to a user device, such as the user devices shown and described with respect to FIG. 1A (e.g., a desktop, a laptop, a cellphone, a tablet, and/or the like). In some embodiments, the sample output data may be transmitted to both a user device and a mixed reality apparatus, such that each device (e.g., the user device and the mixed reality apparatus) are configured to show different data associated with the sample output data. For example, a user device may receive the sample output data and show the sample output data while the mixed reality apparatus (e.g., smart glasses) receive data of the at least one source code statement.

As shown in block 314, the process flow 300 may include the step of comparing the at least one sample output data and the at least one expected output data and determining whether the at least one source code statement is valid. As used herein, the term "compare," "comparison," and/or the like, refers to a determination of whether the data matches (e.g., the sample output data and the expected output data). In some embodiments, the comparison may comprise a side-by-side determination of whether the data exactly matches. For instance, such an exact matching may comprise a math of a sequence comprising a numerical, an alphabetic, a value, a binary sequence, and/or the like, exact matching between the sample output data and the expected output data.

In some embodiments, and as shown in block 316, the process flow 300 may include the step of determining—in an instance where the at least one sample output data does not match the at least one expected output data—the at least one source code statement is invalid. For instance, and in the instance where the one sample output data does not match the at least one expected output data, then the system may identify and/or receive an indication that the source code statement is invalid based on the sample output data generated. In some embodiments, the expected output data may be automatically compared against the sample output data for each of the input data generated.

In some embodiments, the system may identify and/or receive an indication of invalidity based on a user inputting the invalidity indication to a user device and/or a mixed reality apparatus and the user device and/or mixed reality apparatus transmitting the invalidity indication to the system (such as over a network, like network 110 of FIG. 1A).

In some embodiments, such an invalidity indication may be used by the system to further train and refine the source code output machine learning model. In some embodiments, the user-provided invalid indication may additionally and/or alternatively comprise a modification to the at least one source code statement that is associated with the at least one sample output data that does not match the expected output data (i.e., where the sample output data is incorrect and thus, the likely underlying source code statement is also incorrect or invalid).

In some embodiments, and as shown in block 318, the process flow 300 may include the step of determining—in an instance where the at least one sample output data does match the at least one expected output data—the at least one source code statement is valid. For example, and in the instance where the sample output data does match the at least one expected output data, the system may automatically determine that the source code statement used to train the source code output machine learning model is valid and correct. In some embodiments, and upon determining the at least one sample output data is valid, the system may configure the GUI and/or the field of view of the user device and/or mixed reality apparatus with the sample output data to only show the sample output data. In this manner, the underlying source code statement that was used to train the source code output machine learning model may remain private and secure and the user of the user device and/or mixed reality apparatus that the source code output machine learning model is correctly trained.

In some embodiments, the valid indication may be received and/or identified based on a user-provided input at the user device and/or the mixed reality apparatus. Similar to the process described above, a user may input a valid indication for a source code statement based on identifying that the sample output data matches the expected output data for each source code statement used to train the source code output machine learning model.

FIG. 4 illustrates a process flow 400 for generating an intelligent source code change to the at least one source code statement, in accordance with an embodiment of the disclosure. In some embodiments, a system (e.g., similar to one or more of the systems described herein with respect to FIGS. 1A-1C) may perform one or more of the steps of process flow 400. For example, a system (e.g., the system 130 described herein with respect to FIG. 1A-1C) may perform the steps of process 400. In some embodiments, a machine learning model (e.g., such as the machine learning subsystem described herein with respect to FIG. 2) may perform some or all of the steps described in process flow 400.

In some embodiments, and as shown in block 402, the process flow 400 may include the step of generating a sample output data interface component, the sample output data interface component comprising the at least one sample output data. For example, the system may generate a sample output data interface component, whereby the sample output data interface component comprises at least the sample output data (e.g., the sample output data described in FIG. 3) which is shown on a user device and/or a mixed reality apparatus.

In some embodiments, and as shown in block 404, the process flow 400 may include the step of transmitting the sample output data interface component to the mixed reality apparatus to configure a field of view of the mixed reality apparatus. For instance, the sample output data interface component may be transmitted to a user device and/or mixed reality apparatus and configure the field of view of the mixed reality apparatus and/or a graphical user interface of a user device to show at least the sample output data to the user. In some embodiments, the sample output data interface component may configure the field of view of the mixed reality apparatus with the at least one source code statement that is determined as invalid and the sample output data, such that only those source code statements that are necessary to change the invalid source code statements are shown. In this way, the system may keep the valid source code statements that were used to train the source code output machine learning model secure and private.

In some embodiments, the sample output data interface component may show both the at least one source code statement(s) and associated sample output data which was generated. For example, and where the at least one source code statement is determined as invalid, the system may transmit the sample output data interface component to the user device and/or the mixed reality apparatus to show at least the sample output data generated and the source code statements determined as invalid.

In some embodiments, only the at least one sample output data may be shown with the input data processed by the source code output machine learning model to generate the at least one sample output data. In this manner, the logic and coding parameters of the at least one source code statement remains secure and private while showing the user the input data and the sample output data generated, such that the user may make the determination of whether the source code output machine learning model is acting correctly and/or whether the source code output machine learning model should be retrained.

In some embodiments, what is shown in the field of view and/or on the configured graphical user interface based on the sample output data interface component may dynamically change based on a security attribute associated with a user account using the mixed reality apparatus and/or the user device. Such an embodiment is described in further detail below with respect to FIG. 5.

Additionally, and/or alternatively, and as shown in block 406, the process flow 400 may include the step of receiving—by the mixed reality apparatus—a user input comprising a change indication associated with the at least one source code statement. For example, a change indication may comprise an indication showing at least one of the source code statement(s) has changed and/or the sample output data has changed. For instance, such an indication may comprise a check mark, a tick mark, and/or the like which may comprise a binary indicator showing either that a user-provided change has occurred (e.g., a new sample output data has been input that is actually correct, or actually matches an expected output data, and/or a change has occurred to the at least one source code statement). Such an embodiment regarding the change indication is exemplarily shown in FIGS. 7A-7B.

In some embodiments, and as shown in block 408, the process flow 400 may include the step of generating—in response to receiving the user input—an intelligent source code change to the at least one source code statement, wherein the intelligent source code change comprises a change to the at least one source code statement associated with the invalid determination. For instance, the intelligent source code change may be dynamic in nature, such that the intelligent source code change may occur automatically and/or may update based on a refining and retraining of the source code output machine learning model in the instance where the source code output machine learning model is retrained. In some embodiments, such a change to the at least one source code statement may be continuously applied and processed by the source code output machine learning model to continuously train and refine the source code output machine learning model. Similarly, and in some embodiments, an update to the sample output data may occur (e.g., such as through receiving a user-provided update to the sample output data which may match the expected output data) and the updated sample output data may be used to retrain the source code output machine learning model.

FIG. 5 illustrates a process flow 500 for configuring a sample output data interface component comprising a secure rendering of the at least one source code statement, in accordance with an embodiment of the disclosure. In some embodiments, a system (e.g., similar to one or more of the systems described herein with respect to FIGS. 1A-1C) may perform one or more of the steps of process flow 500. For example, a system (e.g., the system 130 described herein with respect to FIG. 1A-1C) may perform the steps of process 500. In some embodiments, a machine learning model (e.g., such as the machine learning subsystem described herein with respect to FIG. 2) may perform some or all of the steps described in process flow 500.

In some embodiments, and as shown in block 502, the process flow 500 may include the step of identifying a user identifier associated with the mixed reality apparatus. As used herein, the term "user identifier" refers to a unique series of alphanumeric characters which may comprise numbers, letters, symbols, and/or the like, which uniquely identify a user account associated with the system (e.g., associated with a client of the system, associated with a manager of the system, and/or the like). The user identifier may be identified based on the input and transmission of user authentication credentials before and/or during the process(es) described herein. In some embodiments, the user identifier may be identified based on the user device used by the user and/or the mixed reality apparatus used by the user, whereby at least one of the user device and/or the mixed reality apparatus may be registered to a particular user and associated user account. In this manner, the user account may then be used to identify the user identifier for the user using the user device and/or mixed reality apparatus.

In some embodiments, and as shown in block 504, the process flow 500 may include the step of identifying—based on the user identifier—a security attribute. For example, the security attribute may be based on an entity identifier stored in association with the user identifier. For example, a security attribute may be used to identify whether the associated user account of the user identifier has security clearance to view the source code statement(s), the sample output data, and the input data, or if the user has security clearance to only view the input data and the sample output data.

In some embodiments, the security attribute may be stored in an index, database, and/or the like, and may be linked, mapped, and/or stored in association with the user identifier itself and/or with an entity identifier. In some embodiments, the entity identifier may be used to identify a particular team within an organization that the user is associated with, such as an information technology team (IT team), a security team, a business team, a sales team, and/or the like. In some embodiments, and by way of example, only certain teams within an organization may have security clearance to view both the at least one source code statement(s) and the at least one sample output data (e.g., such as the IT team, security team, and/or the like). Alternatively, and by way of example, only certain teams and/or all of the leftover teams within an organization may have security clearance to view only the at least one sample output data, without the at least one source code statement(s). In this way, the at least one source code statement(s) may remain secure and private from those teams and/or users that should not have access to the underlying source code statements or the associated logic.

In some embodiments, and as shown in block 506, the process flow 500 may include the step of configuring—based on the security attribute—a source code interface component to configure a field of view of the mixed reality apparatus, wherein the source code interface component comprises a secure rendering of the at least one source code statement based on the security attribute. For instance, and based on the security attribute, the sample output data interface component (like that previously described) may automatically and dynamically change to shown only the data allowed based on the security clearance of the security attribute. Such a showing of data may be based on a configuration of the mixed reality apparatus's field of view to show a secure rendering only to the user of the mixed reality apparatus with the source code statement and the at least one sample output data, where the user has security clearance to view the at least one source code statement. In some embodiments, only the source code statements associated with an invalid indication (e.g., where the at least one sample output data is invalid or incorrect) will be shown to the user of the mixed reality apparatus, and only sample output data without the source code statements will be shown for those sample output data that match the expected output data (i.e., are valid).

FIG. 6 illustrates a process flow 600 for training the source code output machine learning model in at least a first instance, in accordance with an embodiment of the disclosure. In some embodiments, a system (e.g., similar to one or more more of the systems described herein with respect to FIGS. 1A-1C) may perform one or more of the steps of process flow 600. For example, a system (e.g., the system 130 described herein with respect to FIG. 1A-1C) may perform the steps of process 600. In some embodiments, a machine learning model (e.g., such as the machine learning subsystem described herein with respect to FIG. 2) may perform some or all of the steps described in process flow 600.

In some embodiments, and as shown in block 602, the process flow 600 may include the step of collecting a set of previous source code statements from a source code statement database. For instance, the system may collect a set of previous source code statements, whereby the set of previous source code statements may be associated with only one programming language, a plurality of programming languages, and/or the like. The system may collect the at least one previous source code statement(s) from a source code statement database, whereby the source code statement database may additionally comprise sample inputs. In this manner, and as described in further detail below, a machine learning model (such as the source code output machine learning model) may be trained to determine—based on the sample inputs and the generation of the expected output data—a pattern that the previous source code statement(s) are attempting to generate and follow when processing the sample inputs and generating the expected output data.

In some embodiments, and as shown in block 604, the process flow 600 may include the step of applying a set of previous data inputs to the set of previous source code statements. Similarly, and as discussed briefly above, a set of previous data inputs which are additionally stored with the at least one previous source code statements may be applied to the previous source code statement(s) to generate the expected output data used to train the source code output machine learning model. Such expected output data comprises an accurate output based on the input data applied to valid or correct logic underlying the source code statement (s) (i.e., accurate with respect to the intention behind the source code statement(s)).

In some embodiments, and as shown in block 606, the process flow 600 may include the step of creating a first training data set comprising the set of previous expected output data, the set of previous source code statements and the set of previous data inputs. For example, the system may be configured to generate at least a first training data set comprising the previous expected output data and the associated input data in order for the source code output machine learning model to be trained to determine the logic behind the source code statements. In other words, the source code output machine learning model may sit atop the source code statements (previous source code statements) as the source code statements receive and process the previous input data and generate the expected output data.

In some embodiments, and as shown in block 608, the process flow 600 may include the step of training the source code output machine learning model with the first training data set. Thus, and based on at least the first training data set, the source code output machine learning model may be trained with the at least the first training data set and may—at a future time—act as the source code statements themselves to generate sample output data from currently received or identified data inputs. Additionally, and based on at least the first training data set, the source code output machine learning model may be trained with the at least the first training data set and may—at a future time—continue to be trained and refined as the source code statements generate output data (sample output data and expected output data) in order to generate sample output data from currently received or identified data inputs.

FIGS. 7A-7B illustrate exemplary graphical user interfaces and field of views showing source code statements, exemplary input data, and exemplary sample output data, in accordance with an embodiment of the disclosure. In some embodiments, a system (e.g., similar to one or more of the systems described herein with respect to FIGS. 1A-1C) may perform one or more of the steps to generate graphical user interfaces and field of views 700 and 750. For example, a system (e.g., the system 130 described herein with respect to FIG. 1A-1C) may perform the steps to generate graphical user interfaces and field of views 700 and 750. In some embodiments, a machine learning model (e.g., such as the machine learning subsystem described herein with respect to FIG. 2) may perform some or all of the steps to generate graphical user interfaces and field of views 700 and 750.

As shown in the configured field of view and/or configured graphical user interface 700, a plurality of source code statements 701 and a plurality of sample output data 702 may be transmitted as a sample output data interface component to a mixed reality apparatus and/or a user device. In some embodiments, a user device may only receive a portion of data from the sample output data interface component and the mixed reality apparatus may receive different data from the sample output data interface component (e.g., such as the source code statement(s)).

As shown in the configured field of view and/or configured graphical user interface 750 may additionally comprise tick marks and/or check marks (e.g., 751, 752, 753) indicating which source code statements are valid and invalid. For instance, such a tick mark and/or check mark may indicate that a change has occurred to at least one of the source code statement itself or to the sample output data (e.g., updated sample output data) which may be used to retrain the source code output machine learning model. In some embodiments, the tick marks and/or check marks may be generated after a change to the source code statement itself or to the sample output data has occurred and the user that input the change(s) approve the change(s).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for implementing a mixed reality apparatus to automatically and dynamically generate output based on source code, the system comprising:

a memory device with computer-readable program code stored thereon;

at least one processing device, wherein executing the computer-readable code is configured to cause the at least one processing device to perform the following operations:

identify at least one source code statement;

apply the at least one source code statement to a source code output machine learning model and train the source code output machine learning model with the at least one source code statement;

generate at least one input data for the at least one source code statement, wherein the at least one input data is associated with an at least one expected output data;

apply the at least one input data to the source code output machine learning model;

output, by the source code output machine learning model, the at least one sample output data associated with the at least one input data applied to the source code output machine learning model;

compare the at least one sample output data and the at least one expected output data and determine whether the at least one source code statement is valid, wherein, in an instance where the at least one sample output data does not match the at least one expected output data, determine the at least one source code statement is invalid, or wherein, in an instance where the at least one sample output data does match the at least one expected output data, determine the at least one source code statement is valid;

transmit the at least one sample output data to a mixed reality apparatus as a secure rendering, wherein the secure rendering comprising the at least one sample output data at the mixed reality apparatus is based on a user identifier associated with the mixed reality apparatus comprising a security attribute that identifies a security clearance of a user of the mixed reality apparatus, and wherein the secure rendering of the at least one sample output data comprises:

triggering, based on the security clearance and based on the validation of the at least one source code statement a, the secure rendering at the mixed reality apparatus, wherein, in an instance where the security clearance allows a viewing of the at least one source code statement for the user and the at least one source code statement is determined to be invalid, the secure rendering shows the at least one source code statement, the at least one input data, and the at least one sample output data at the mixed reality apparatus, or wherein, in an instance where the security clearance only allows a viewing of the at least one sample output data for the user and the at least one source code statement is valid, the at least one input data and the at least one sample output data at the mixed reality apparatus;

replace, based on the validity of the at least one source code statement, the at least one source code statement with the source code output machine learning model;

identify secondary input data;

apply, based on the replacement of the at least one source code statement with the source code output machine learning model, the secondary input data to the source code machine learning model; and generate, in response to the application of the secondary input data, a secondary output data from the source code output machine learning model.

2. The system of claim 1, wherein the application of the at least one source code statement to the source code output machine learning model occurs before the application of the at least one input data to the source code output machine learning model.

3. The system of claim 1, wherein the computer-readable code is configured to cause the at least one processing device to perform the following operations:

generate a sample output data interface component, the sample output data interface component comprising the at least one sample output data; and transmit the sample output data interface component to the mixed reality apparatus to configure a field of view of the mixed reality apparatus.

4. The system of claim 3, wherein the sample output data interface component configures the field of view of the mixed reality apparatus with the at least one source code statement that is determined as invalid.

5. The system of claim 3, wherein the computer-readable code is configured to cause the at least one processing device to perform the following operations:

receive, by the mixed reality apparatus, a user input comprising a change indication associated with the at least one source code statement; and generate, in response to receiving the user input, an intelligent source code change to the at least one source statement, wherein the intelligent source code change comprises a change to the at least one source code associated with the invalid determination.

6. The system of claim 1, wherein the mixed reality apparatus comprises a mixed reality smart glass.

7. The system of claim 1, wherein the computer-readable code is configured to cause the at least one processing device to perform the following operations:

identify a user identifier associated with the mixed reality apparatus;

identify, based on the user identifier, a security attribute; and configure, based on the security attribute, a source code interface component to configure a field of view of the mixed reality apparatus, wherein the source code interface component comprises a secure rendering of the at least one source code statement based on the security attribute.

8. The system of claim 7, wherein the security attribute is based on an entity identifier stored in association with the user identifier.

9. The system of claim 1, wherein the computer-readable code is configured to cause the at least one processing device to perform the following operations:

collect a set of previous source code statements from a source code statement database;

apply a set of previous data inputs to the set of previous source code statements;

generate a set of previous expected output data based on the application of the previous data inputs;

create a first training data set comprising the set of previous expected output data, the set of previous source code statements, and the set of previous data inputs; and train the source code output machine learning model with the first training data set.

10. A computer program product for implementing a mixed reality apparatus to automatically and dynamically generate output based on source code, wherein the computer program product comprises at least one non-transitory computer-readable medium having computer-readable program code portions embodied therein, the computer-readable program code portions which when executed by a processing device are configured to cause the processor to perform the following operations:

identify at least one source code statement;

apply the at least one source code statement to a source code output machine learning model and train the source code output machine learning model with the at least one source code statement;

generate at least one input data for the at least one source code statement, wherein the at least one input data is associated with an at least one expected output data;

apply the at least one input data to the source code output machine learning model;

output, by the source code output machine learning model, the at least one sample output data associated with the at least one input data applied to the source code output machine learning model;

compare the at least one sample output data and the at least one expected output data and determine whether the at least one source code statement is valid, wherein, in an instance where the at least one sample output data does not match the at least one expected output data, determine the at least one source code statement is invalid, or wherein, in an instance where the at least one sample output data does match the at least one expected output data, determine the at least one source code statement is valid;

transmit the at least one sample output data to a mixed reality apparatus as a secure rendering, wherein the secure rendering comprising the at least one sample output data at the mixed reality apparatus is based on a user identifier associated with the mixed reality apparatus comprising a security attribute that identifies a security clearance of a user of the mixed reality apparatus, and wherein the secure rendering of the at least one sample output data comprises:

triggering, based on the security clearance and based on the validation of the at least one source code statement a, the secure rendering at the mixed reality apparatus, wherein, in an instance where the security clearance allows a viewing of the at least one source code statement for the user and the at least one source code statement is determined to be invalid, the secure rendering shows the at least one source code statement, the at least one input data, and the at least one sample output data at the mixed reality apparatus, or wherein, in an instance where the security clearance only allows a viewing of the at least one sample output data for the user and the at least one source code statement is valid, the at least one input data and the at least one sample output data at the mixed reality apparatus;

replace, based on the validity of the at least one source code statement, the at least one source code statement with the source code output machine learning model;

identify secondary input data;

apply, based on the replacement of the at least one source code statement with the source code output machine learning model, the secondary input data to the source code machine learning model; and generate, in response to the application of the secondary input data, a secondary output data from the source code output machine learning model.

11. The computer program product of claim 10, wherein the application of the at least one source code statement to the source code output machine learning model occurs before the application of the at least one input data to the source code output machine learning model.

12. The computer program product of claim 10, wherein the processing device is configured to cause the processor to perform the following operations:

generate a sample output data interface component, the sample output data interface component comprising the at least one sample output data; and transmit the sample output data interface component to the mixed reality apparatus to configure a field of view of the mixed reality apparatus.

13. The computer program product of claim 12, wherein the sample output data interface component configures the field of view of the mixed reality apparatus with the at least one source code statement that is determined as invalid.

14. The computer program product of claim 10, wherein the mixed reality apparatus comprises a mixed reality smart glass.

15. The computer program product of claim 10, wherein the processing device is configured to cause the processor to perform the following operations:

collect a set of previous source code statements from a source code statement database;

apply a set of previous data inputs to the set of previous source code statements;

generate a set of previous expected output data based on the application of the previous data inputs;

create a first training data set comprising the set of previous expected output data, the set of previous source code statements, and the set of previous data inputs; and train the source code output machine learning model with the first training data set.

16. A computer implemented method for implementing a mixed reality apparatus to automatically and dynamically generate output based on source code, the computer implemented method comprising:

identifying at least one source code statement;

applying the at least one source code statement to a source code output machine learning model and train the source code output machine learning model with the at least one source code statement;

generating at least one input data for the at least one source code statement, wherein the at least one input data is associated with an at least one expected output data;

applying the at least one input data to the source code output machine learning model;

outputting, by the source code output machine learning model, the at least one sample output data associated with the at least one input data applied to the source code output machine learning model;

comparing the at least one sample output data and the at least one expected output data and determine whether the at least one source code statement is valid, wherein, in an instance where the at least one sample output data does not match the at least one expected output data, determining the at least one source code statement is invalid, or wherein, in an instance where the at least one sample output data does match the at least one expected output data, determining the at least one source code statement is valid;

transmitting the at least one sample output data to a mixed reality apparatus as a secure rendering, wherein the secure rendering comprising the at least one sample output data at the mixed reality apparatus is based on a user identifier associated with the mixed reality apparatus comprising a security attribute that identifies a security clearance of a user of the mixed reality apparatus, and wherein the secure rendering of the at least one sample output data comprises:

triggering, based on the security clearance and based on the validation of the at least one source code statement a, the secure rendering at the mixed reality apparatus, wherein, in an instance where the security clearance allows a viewing of the at least one source code statement for the user and the at least one source code statement is determined to be invalid, the secure rendering shows the at least one source code statement, the at least one input data, and the at least one sample output data at the mixed reality apparatus, or wherein, in an instance where the security clearance only allows a viewing of the at least one sample output data for the user and the at least one source code statement is valid, the at least one input data and the at least one sample output data at the mixed reality apparatus;

replacing, based on the validity of the at least one source code statement, the at least one source code statement with the source code output machine learning model;

identifying secondary input data;

applying, based on the replacement of the at least one source code statement with the source code output machine learning model, the secondary input data to the source code machine learning model; and generating, in response to the application of the secondary input data, a secondary output data from the source code output machine learning model.

17. The computer implemented method of claim 16, wherein the application of the at least one source code statement to the source code output machine learning model occurs before the application of the at least one input data to the source code output machine learning model.

18. The computer implemented method of claim 16, the computer implemented method comprising:

generating a sample output data interface component, the sample output data interface component comprising the at least one sample output data; and transmitting the sample output data interface component to the mixed reality apparatus to configure a field of view of the mixed reality apparatus.

19. The computer implemented method of claim 18, wherein the sample output data interface component configures the field of view of the mixed reality apparatus with the at least one source code statement that is determined as invalid.

20. The computer implemented method of claim 16, wherein the mixed reality apparatus comprises a mixed reality smart glass.

* * * * *